United States Patent
Ryu et al.

(10) Patent No.: US 9,903,281 B2
(45) Date of Patent: Feb. 27, 2018

(54) APPARATUS AND METHOD FOR CONTROLLING ENGINE

(71) Applicant: HYUNDAI MOTOR COMPANY, Seoul (KR)

(72) Inventors: In Sang Ryu, Incheon (KR); Kyoung Pyo Ha, Seongnam-si (KR); You Sang Son, Suwon-si (KR); Kiyoung Kwon, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/265,011

(22) Filed: Sep. 14, 2016

(65) Prior Publication Data

US 2017/0167394 A1    Jun. 15, 2017

(30) Foreign Application Priority Data

Dec. 11, 2015  (KR) .......................... 10-2015-0177461

(51) Int. Cl.
  *F02D 13/02*  (2006.01)
  *F02D 41/00*  (2006.01)
  *F02D 41/26*  (2006.01)

(52) U.S. Cl.
  CPC ..... *F02D 13/0207* (2013.01); *F02D 13/0215* (2013.01); *F02D 13/0219* (2013.01); *F02D 13/0261* (2013.01); *F02D 41/0002* (2013.01); *F02D 41/009* (2013.01); *F02D 41/26* (2013.01); *F02D 2041/001* (2013.01);
(Continued)

(58) Field of Classification Search
  CPC ............. F02D 13/0207; F02D 13/0261; F02D 13/0203; F02D 13/0211; F02D 13/0215; F02D 13/0226; F02D 13/023; F02D 41/26; F02D 41/009; F02D 41/0002; F02D 2041/0001; F02D 2041/002; F02D 2200/101; F02D 2200/023;
(Continued)

(56) References Cited

U.S. PATENT DOCUMENTS

| | | | | |
|---|---|---|---|---|
| 5,046,461 A | * | 9/1991 | Kanehiro | B60K 28/16 123/90.15 |
| 5,080,055 A | * | 1/1992 | Komatsu | F01L 1/08 123/90.11 |

(Continued)

FOREIGN PATENT DOCUMENTS

| KR | 10-0321206 B1 | 1/2002 |
|---|---|---|
| KR | 10-2009-0013007 A | 2/2009 |

*Primary Examiner* — Stephen K Cronin
*Assistant Examiner* — George Jin
(74) *Attorney, Agent, or Firm* — Brinks Gilson & Lione (57) ABSTRACT

Methods and devices are provided for controlling an engine provided with a continuously variable valve timing (CVVT) device disposed on an intake valve side, and with a continuous variable valve duration (CVVD) device and a continuously variable valve timing (CVVT) disposed on an exhaust valve side according to an exemplary form of the present disclosure. A method may include classifying a plurality of control regions depending on an engine speed and an engine load, and based upon which of the plurality of control regions is a control region of the engine, controlling opening and closing timing of the intake valve, controlling opening and closing timing of the exhaust valve, and controlling open duration of the exhaust valve.

10 Claims, 6 Drawing Sheets

(52) U.S. Cl.
CPC .. *F02D 2041/002* (2013.01); *F02D 2200/023* (2013.01); *F02D 2200/0404* (2013.01); *F02D 2200/101* (2013.01); *F02D 2200/501* (2013.01); *F02D 2200/602* (2013.01)

(58) Field of Classification Search
CPC ....... F02D 2200/0404; F02D 2200/501; F02D 2200/602
See application file for complete search history.

(56) References Cited

U.S. PATENT DOCUMENTS

| | | | | |
|---|---|---|---|---|
| 2005/0087158 A1* | 4/2005 | Tanei | .................... | F02D 35/027 123/90.15 |
| 2007/0181096 A1* | 8/2007 | Wagner | .............. | F02D 13/0261 123/299 |
| 2009/0084333 A1* | 4/2009 | Cleary | ................ | F02D 13/0207 123/90.17 |
| 2009/0299603 A1* | 12/2009 | Fuwa | .................... | F02D 13/0207 701/103 |
| 2017/0167393 A1* | 6/2017 | Ryu | ........................ | F02D 41/26 |
| 2017/0167394 A1* | 6/2017 | Ryu | .................... | F02D 13/0215 |
| 2017/0167396 A1* | 6/2017 | Ryu | .................... | F02D 41/0002 |
| 2017/0167399 A1* | 6/2017 | Ryu | .................... | F02D 13/0215 |
| 2017/0167400 A1* | 6/2017 | Ryu | .................... | F02D 13/0215 |
| 2017/0167401 A1* | 6/2017 | Ryu | ......................... | F01L 1/34 |
| 2017/0167402 A1* | 6/2017 | Ryu | .................... | B60W 20/10 |
| 2017/0167403 A1* | 6/2017 | Ryu | .................... | B60W 10/06 |
| 2017/0167404 A1* | 6/2017 | Ryu | .................... | F02D 13/0215 |
| 2017/0167405 A1* | 6/2017 | Ryu | .................... | F01L 13/0015 |
| 2017/0167406 A1* | 6/2017 | Ryu | ......................... | F01L 1/34 |
| 2017/0167407 A1* | 6/2017 | Ryu | ......................... | F01L 1/34 |
| 2017/0167409 A1* | 6/2017 | Ryu | .................... | F02D 13/0215 |
| 2017/0167414 A1* | 6/2017 | Ryu | .................... | F02B 37/00 |
| 2017/0234243 A1* | 8/2017 | Ryu | .................... | F02D 13/0207 123/350 |

* cited by examiner

APPARATUS AND METHOD FOR CONTROLLING ENGINE

CROSS-REFERENCE TO RELATED APPLICATION

This application claims priority to and the benefit of Korean Patent Application No. 10-2015-0177461 filed in the Korean Intellectual Property Office on Dec. 11, 2015, the entire contents of which is incorporated herein by reference.

FIELD

The present disclosure relates to an apparatus and a method for controlling an engine. More particularly, the present disclosure relates to an apparatus and a method for controlling an engine that simultaneously controls duration and timing of valves that is equipped with a continuously variable valve timing device disposed on an intake valve side, and with a continuous variable valve duration device and a continuously variable valve timing device disposed on an exhaust valve side.

BACKGROUND

The statements in this section merely provide background information related to the present disclosure and may not constitute prior art.

An internal combustion engine combusts mixed gas in which fuel and air are mixed at a predetermined ratio through a set ignition mode to generate power by using explosion pressure.

Generally, a camshaft is driven by a timing belt connected with a crankshaft that converts linear motion of a cylinder due to the explosion pressure into rotating motion to actuate an intake valve and an exhaust valve. Generally, while the intake valve is opened, air is suctioned into a combustion chamber, and while an exhaust valve is opened, gas that has been combusted in the combustion chamber is exhausted.

To improve the operations of the intake valve and the exhaust valve and thereby improve engine performance, a valve lift and a valve opening/closing time (timing) should be controlled according to a rotational speed or load of an engine. Therefore, a continuous variable valve duration (CVVD) device controlling the open duration of an intake valve and an exhaust valve of the engine, and a continuous variable valve timing (CVVT) device controlling the opening and closing timing of the intake valve and the exhaust valve of the engine, have been developed.

The CVVD device may control open duration of the valve. In addition, the CVVT device may advance or delay the opening or closing timing of the valve while the open duration of the valve is fixed. That is, if the opening timing of the valve is determined, the closing timing is automatically determined according to the open duration of the valve.

However, to combine the CVVD device and the CVVT device, both the open duration and timing of the valve should be simultaneously controlled.

The above information disclosed in this Background section is only for enhancement of understanding of the background of the disclosure and therefore it may contain information that does not form the prior art that is already known in this country to a person of ordinary skill in the art.

SUMMARY

The present disclosure may provide apparatuses and methods for controlling an engine, which can simultaneously control duration and timing of valves of the engine, where the engine is equipped with a continuously variable valve timing device disposed on an intake valve side, and with a continuous variable valve duration device and a continuously variable valve timing device disposed on an exhaust valve side.

A form of the present disclosure provides a method for controlling an engine provided with a continuously variable valve timing (CVVT) device disposed on an intake valve side, and with a continuous variable valve duration (CVVD) device and a continuously variable valve timing (CVVT) disposed on an exhaust valve side. The method may include classifying, by a controller, a plurality of control regions depending on an engine speed and an engine load. The plurality of control regions may be divided into a first region in which the engine load is less than a first predetermined load, a second region in which the engine load is greater than or equal to the first predetermined load and less than a second predetermined load, a third region in which the engine load is greater than or equal to the second predetermined load and less than a third predetermined load, a fourth region in which the engine load is greater than or equal to the second predetermined load and the engine speed is less than or equal to a predetermined speed, and a fifth region in which the engine load is greater than or equal to a third predetermined load and the engine speed is greater than the predetermined speed. The method may further include, when a control region of the engine is the first region, retarding, by the controller, an intake valve close (IVC) timing, and controlling, by the controller, a valve overlap by using the exhaust valve. The method may further include, when the control region of the engine is the second region, advancing, by the controller, the intake valve close (IVC) timing, and applying a maximum duration to an exhaust valve when the control region. The method may further include, when the control region of the engine is the third region, advancing, by the controller, the intake valve close (IVC) timing according to an increment of engine load. The method may further include, when the control region of the engine is the fourth region, controlling, by the controller, a wide open throttle valve (WOT), advancing, by the controller, the intake valve close (IVC) timing, and retarding, by the controller, an exhaust valve opening (EVO) timing. The method may further include, when the control region of the engine is the fifth region, controlling, by the controller, a wide open throttle valve (WOT), and retarding, by the controller, the intake valve close (IVC) timing.

The controller may, when the control region of the engine is the first region, retard the IVC timing to a maximum value, and control the valve overlap by the exhaust valve by setting up within sustainable combust stability.

The controller may, when the control region of the engine is the second region, fix the EVO timing to reduce exhaust pumping, and apply an exhaust maximum duration by retarding the EVC timing to increase the valve overlap.

The controller may, when the control region of the engine is the third region, maintain the EVO timing by advancing the IVC timing, and control the EVC timing to be close to top dead center.

The controller may, when the control region of the engine is the fifth region, control the EVO timing to be before bottom dead center in order not to increase the valve overlap, and control the EVC timing to be close to top dead center.

Another form of the present disclosure provides an apparatus for controlling an engine. An apparatus for controlling an engine may include: a data detector configured to detect data related to a running state of the vehicle; a camshaft position sensor configured to detect a position of a camshaft; an intake continuous variable valve timing (CWT) device configured to control an opening and closing timing of an intake valve of the engine; an exhaust continuous variable valve duration (CVVD) device configured to control an open duration of an exhaust valve of the engine; an exhaust continuous variable valve timing (CVVT) device configured to control an opening and closing timing of the exhaust valve of the engine; and a controller. The controller may be configured to classify a plurality of control regions depending on an engine speed and an engine load based on signals from the data detector and camshaft position sensor. The controller may be further configured to control the intake CVVT, the exhaust CVVD device, and the exhaust CVVT device according to a control region of the engine. The controller may be further configured to divide the plurality of control regions divided into: a first region in which the engine load is less than a first predetermined load; a second region in which the engine load is greater than or equal to the first predetermined load and less than a second predetermined load; a third region in which the engine load is greater than or equal to the second predetermined load and less than a third predetermined load; a fourth region in which the engine load is greater than or equal to the second predetermined load and the engine speed is less than or equal to a predetermined speed; and a fifth region in which the engine load is greater than or equal to a third predetermined load and the engine speed is greater than the predetermined speed. The controller may be further configured to, when the control region of the engine is the first region, retard an intake valve close (IVC) timing and control a valve overlap by using the exhaust valve. The controller may be further configured to, when the control region of the engine is the second region, advance the intake valve close (IVC) timing and apply a maximum duration to an exhaust valve. The controller may be further configured to, when the control region of the engine is the third region, advance the intake valve close (IVC) timing according to an increment of the engine load The controller may be further configured to, when the control region of the engine is the fourth region, control a wide open throttle valve (WOT), advance the intake valve close (IVC) timing, and retard an exhaust valve opening (EVO) timing. The controller may be further configured to, when the control region of the engine is the fifth region, control the wide open throttle valve (WOT) and retard the intake valve close (IVC) timing.

The controller may be further configured to, when the control region of the engine is the first region, retard the IVC timing to a maximum value and control the exhaust valve close (EVC) timing to a maximum value within sustainable combust stability.

The controller may be further configured to, when the control region of the engine is the second region, fix the EVO timing to reduce exhaust pumping, and apply an exhaust maximum duration by retarding the EVC timing to increase the valve overlap.

The controller may be further configured to, when the control region of the engine is the third region, maintain the EVO timing by retarding the IVC timing and controlling the EVC timing to be close to top dead center.

The controller may be further configured to, when the control region of the engine is the fifth region, control the EVO timing to be before a bottom dead center in order not to increase the valve overlap, and control the EVC timing to be close to the top dead center.

As described above, according to exemplary forms of the present disclosure, duration and timing of the continuous variable valve are simultaneously controlled, so the engine may be controlled under optimum conditions.

That is, opening timing and closing timing of the intake valve and the exhaust valve are optimally controlled, may improve fuel efficiency under a partial load condition and engine performance under a high load condition. In addition, a starting fuel amount may be reduced by increasing a valid compression ratio, and exhaust gas may be reduced by shortening time for heating a catalyst.

Further, since a continuous variable valve duration device disposed on the intake side can be omitted in favor of a fixed cam, it is possible to reduce manufacturing cost and maintain power performance.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following detailed description, only certain exemplary forms of the present disclosure have been shown and described, simply by way of illustration. As those skilled in the art would realize, the described forms may be modified in various different ways, all without departing from the spirit or scope of the present disclosure.

Throughout this specification and the claims which follow, unless explicitly described to the contrary, the word "comprise" and variations such as "comprises" or "comprising" will be understood to imply the inclusion of stated elements but not the exclusion of any other elements.

Like reference numerals designate like elements throughout the specification.

It is understood that the term "vehicle" or "vehicular" or other similar terms as used herein is inclusive of motor vehicles in general including hybrid vehicles, plug-in hybrid electric vehicles, and other alternative fuel vehicles (e.g., fuels derived from resources other than petroleum). As referred to herein, a hybrid electric vehicle is a vehicle that has two or more sources of power, for example a gasoline-powered and electric-powered vehicle.

Additionally, it is understood that some of the methods may be executed by at least one controller.

The term controller refers to a hardware device that includes a memory and a processor configured to execute one or more steps that should be interpreted as its algorithmic structure. The memory is configured to store algorithmic steps, and the processor is specifically configured to execute said algorithmic steps to perform one or more processes which are described further below.

Furthermore, the control logic of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

An exemplary form of the present disclosure will hereinafter be described in detail with reference to the accompanying drawings.

Figure 1:
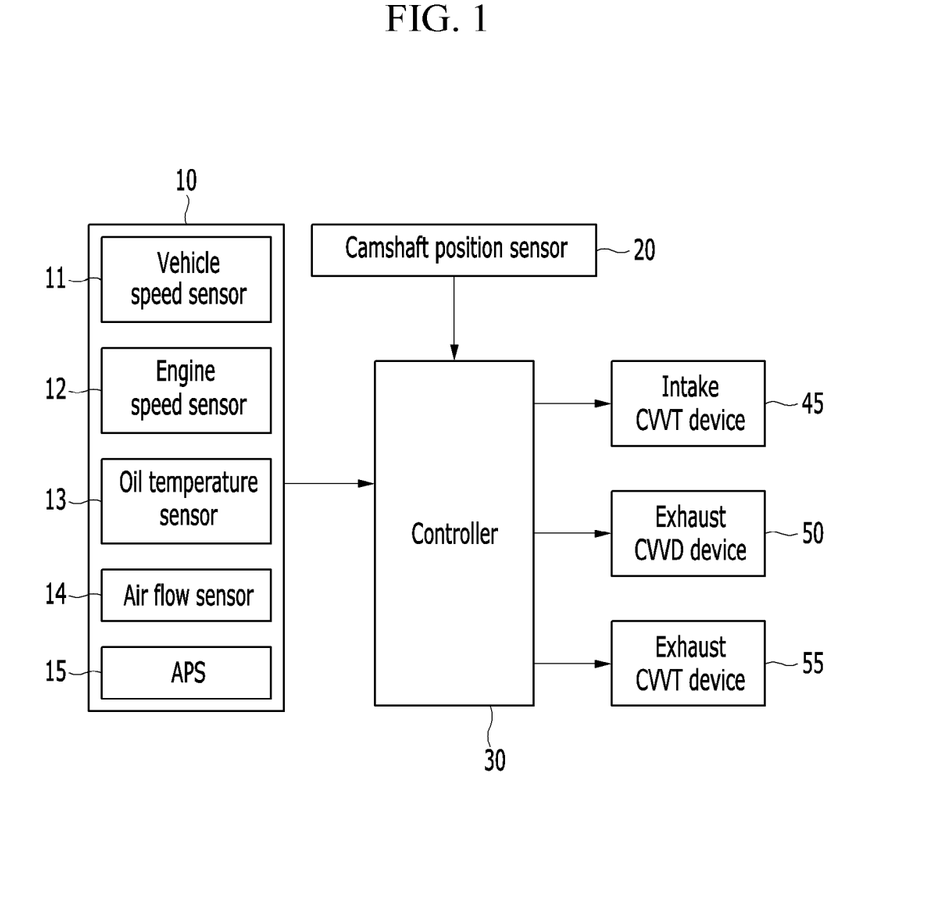
FIG. 1 is a schematic block diagram showing a system for controlling valve timing of a continuous variable valve duration engine.

As shown in FIG. 1, a system for controlling valve timing of a continuous variable valve duration engine according to a form of the present disclosure includes a data detector 10, a camshaft position sensor 20, a controller 30, an intake continuous variable valve timing (CVVT) device 45, an exhaust continuous variable valve duration (CVVD) device 50, and an exhaust continuous variable valve timing (CVVT) device 55.

The data detector 10 is configured to detect data related to a running state of the vehicle for controlling the intake continuously variable valve timing device 45, the exhaust continuous variable valve duration device 50, and the exhaust continuously variable valve timing device 55. The data detector 10 includes a vehicle speed sensor 11, an engine speed sensor 12, an oil temperature sensor 13, an air flow sensor 14, and an accelerator pedal position sensor 15.

The vehicle speed sensor 11 is configured to detect a vehicle speed, and to transmit a corresponding signal to the controller 30, and may be mounted at a wheel of the vehicle.

The engine speed sensor 12 is configured to detect a rotation speed of the engine from a change in phase of a crankshaft or camshaft, and to transmit a corresponding signal to the controller 30.

The oil temperature sensor (OTS) 13 is configured to transmit a temperature of oil flowing through an oil control valve (OCV), and to transmit a corresponding signal to the controller 30.

The oil temperature detected by the oil temperature sensor 13 may be determined by measuring a coolant temperature using a coolant temperature sensor mounted at a coolant passage of an intake manifold. Therefore, in this specification and the scope of the appended claims, the oil temperature sensor 13 may include a coolant temperature sensor, and the oil temperature should be understood to include the coolant temperature.

The air flow sensor 14 is configured to detect an air amount drawn into the intake manifold, and to transmit a corresponding signal to the controller 30.

The accelerator pedal position sensor (APS) 15 is configured to detect a degree to which a driver pushes in an accelerator pedal, and to transmit a corresponding signal to the controller 30. The position value of the accelerator pedal may be 100% when the accelerator pedal is pressed fully, and the position value of the accelerator pedal may be 0% when the accelerator pedal is not pressed at all.

A throttle valve position sensor (TPS) that is mounted on an intake passage may be used instead of the accelerator pedal position sensor 15. Therefore, in this specification and the scope of the appended claims, the accelerator pedal position sensor 15 may include a throttle valve position sensor, and the position value of the accelerator pedal should be understood to include an opening value of the throttle valve.

The camshaft position sensor 20 is configured to detect a change of a camshaft angle, and to transmit a corresponding signal to the controller 30.

Figure 2:
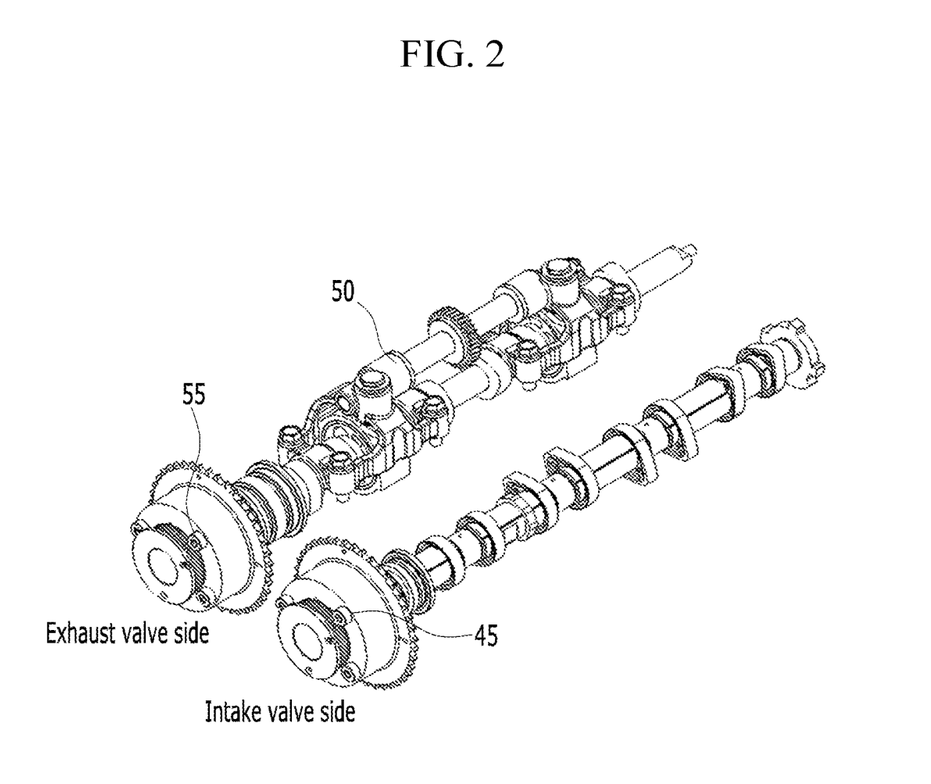
FIG. 2 is a perspective view showing a continuous variable valve timing device which is disposed on an intake valve side and a continuous variable valve duration device which is disposed on an exhaust valve side.

As shown in FIG. 2, in an exemplary form of the present disclosure, through a fixed cam, only the continuously variable valve timing device is disposed on the intake valve, while both the continuous variable valve duration device and the continuously variable valve timing device are disposed on the exhaust valve. Therefore, in an exemplary form of the present disclosure, an intake duration (IVD) is fixed. For example, fuel consumption and performance at high speed are improved as the IVD becomes long, but performance at low speed is inferior. Therefore, the IVD may be fixed as 250-260 degrees considering operation angle of the continuously variable valve timing device.

The intake continuous variable valve timing (CVVT) device 45 is configured to control opening and closing timing of the intake valve of the engine according to a signal from the controller 30, and the exhaust continuous variable valve timing (CVVT) device 55 is configured to control opening and closing timing of the exhaust valve of the engine according to a signal from the controller 30.

The exhaust continuous variable valve duration (CVVD) device 50 is configured to control an open duration of an exhaust valve of the engine according to a signal from the controller 30.

The controller 30 may be configured to classify a plurality of control regions depending on an engine speed and an engine load (or engine torque) based on signals from the data detector 10 and camshaft position sensor 20, and to control the intake CVVT devices 45, and the exhaust CVVD and CVVT devices 50 and 55, according to the control region of the engine. The plurality of control regions may be divided by controller 30 into five regions.

The controller 30 may be configured to, in the first region, retard an intake valve close (IVC) timing and control a valve overlap by using an exhaust valve. The controller 30 may be configured to, in the second region, advance the intake valve close (IVC) timing and apply a maximum duration to an exhaust valve. The controller 30 may be configured to, in the third region, advance the intake valve close (IVC) timing according to increment of the engine load. The controller 30 may be configured to, in the fourth region, control a wide open throttle valve (WOT), advance the intake valve close (IVC) timing, and retard the exhaust valve opening (EVO) timing. And the controller 30 may be configured to, in the fifth region, control the wide open throttle valve (WOT) and retard the intake valve close (IVC) timing.

For these purposes, the controller 30 may be implemented as at least one processor that is operated by a predetermined program, and the predetermined program may be programmed in order to perform each step of a method for controlling valve timing of a continuous variable valve duration engine according to a form of the present disclosure.

Various forms described herein may be implemented within a recording medium that may be read by a computer or a similar device by using software, hardware, or a combination thereof, for example.

The hardware of the forms described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform any other functions.

The software such as procedures and functions of the forms described in the present disclosure may be implemented by separate software modules. Each of the software modules may perform one or more functions and operations described in the present disclosure. A software code may be implemented by a software application written in an appropriate program language.

Referring to FIG. 3A through FIG. 5, a method for controlling an engine according to an exemplary form of the present disclosure will be described in detail.

Figure 3A:
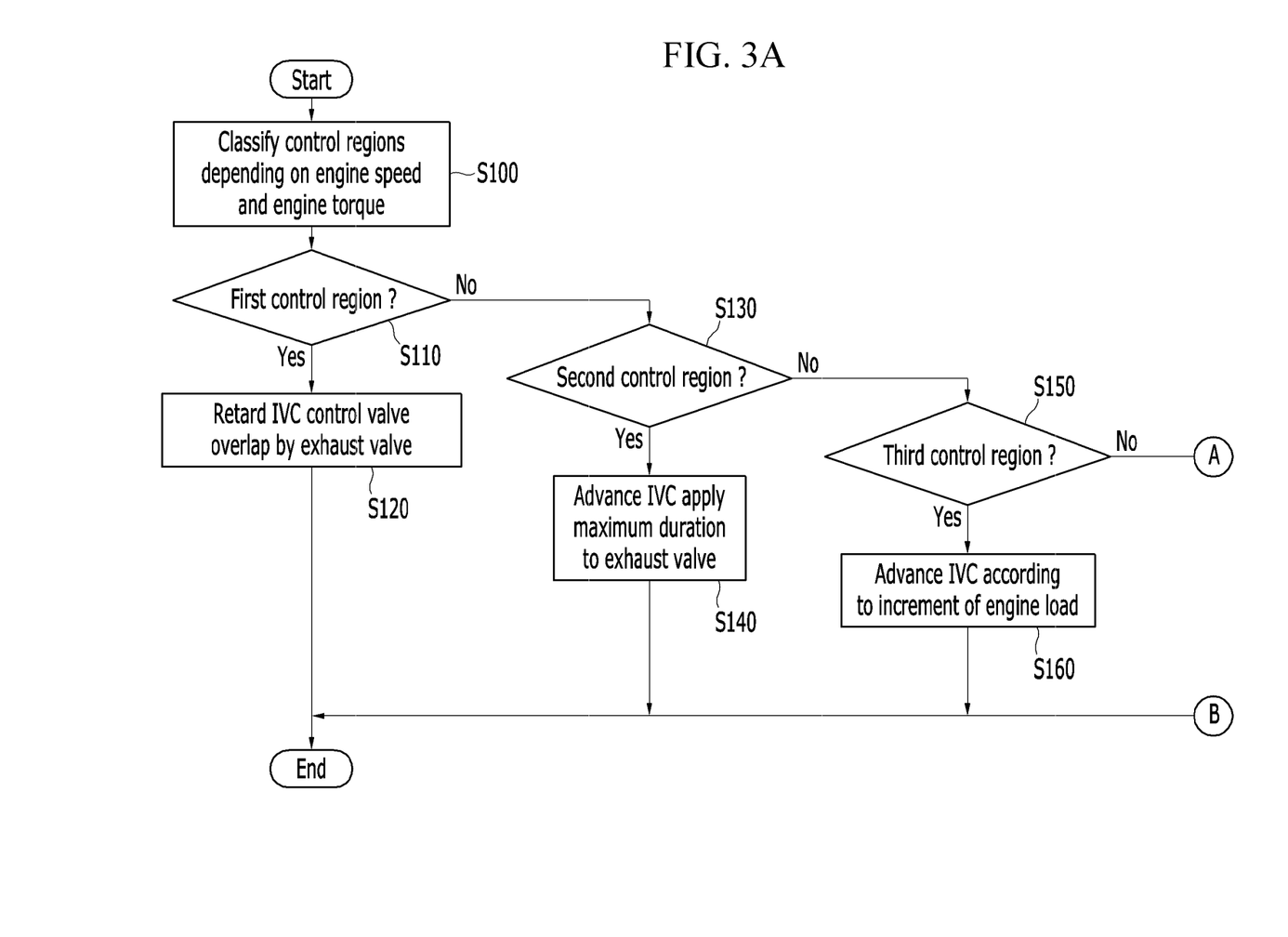
FIG. 3A and FIG. 3B are a flowchart showing a method for controlling valve timing of a continuous variable valve duration engine.
Figure 3B:
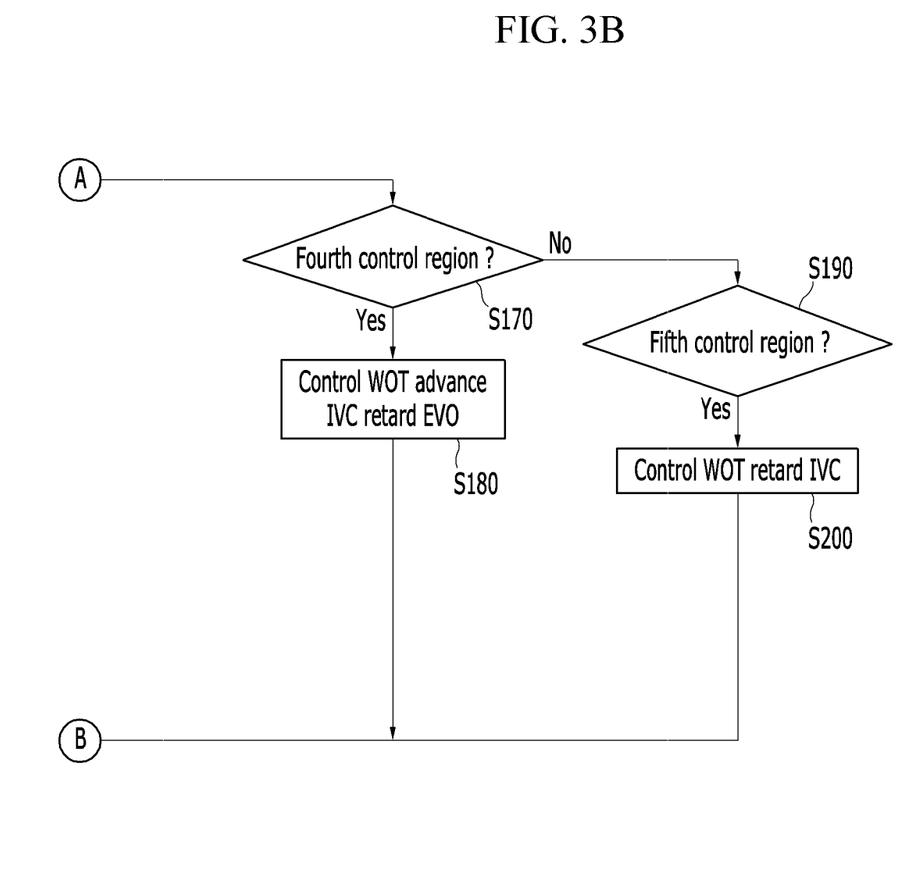

As shown in FIG. 3A and FIG. 3B, a method for controlling valve timing of a continuous variable valve duration engine according to a form of the present disclosure starts at step S100 with classifying, by the controller 30, a plurality of control regions depending on an engine speed and an engine load.

The control regions will be described with reference to FIG. 4 and FIG. 5. The first through fifth control regions are indicated in FIG. 4 and FIG. 5.

The controller 30 may be configured to classify control regions as: a first control region when the engine load is less than a first predetermined load; a second region when the engine load is greater than or equal to the first predetermined load and less than a second predetermined load; and a third region when the engine load is greater than or equal to the second predetermined load and less than a third predetermined load. In addition, the controller 30 may be configured to classify control regions as: a fourth region when the engine load is greater than or equal to the second predetermined load and the engine speed is less than a predetermined speed; and a fifth region when the engine load is greater than or equal to the third predetermined load and the engine speed is greater than or equal to the predetermined speed.

Figure 4:
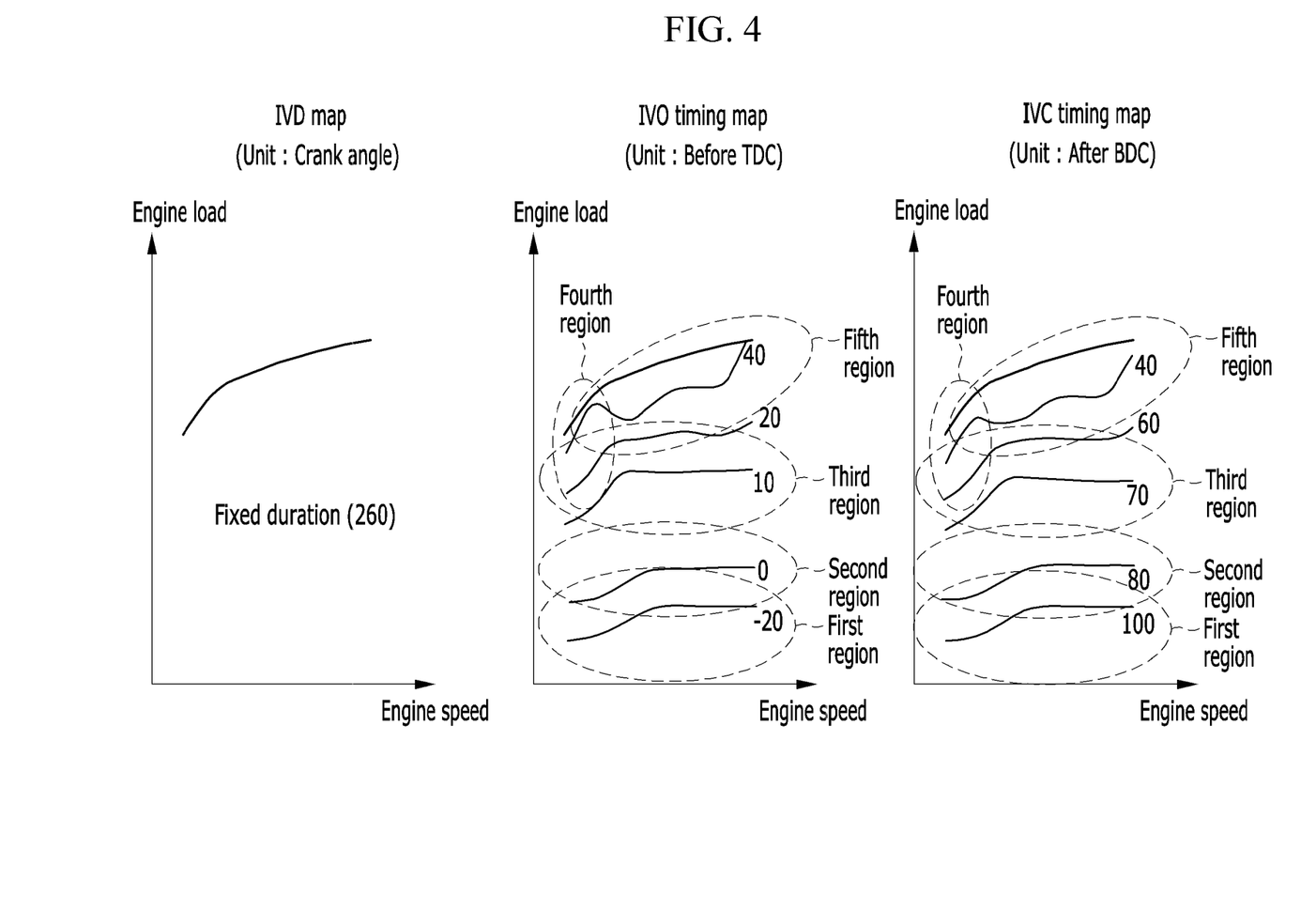
FIG. 4 is a graph showing duration, opening timing, and closing timing of an intake valve depending on an engine load and an engine speed.
Figure 5:
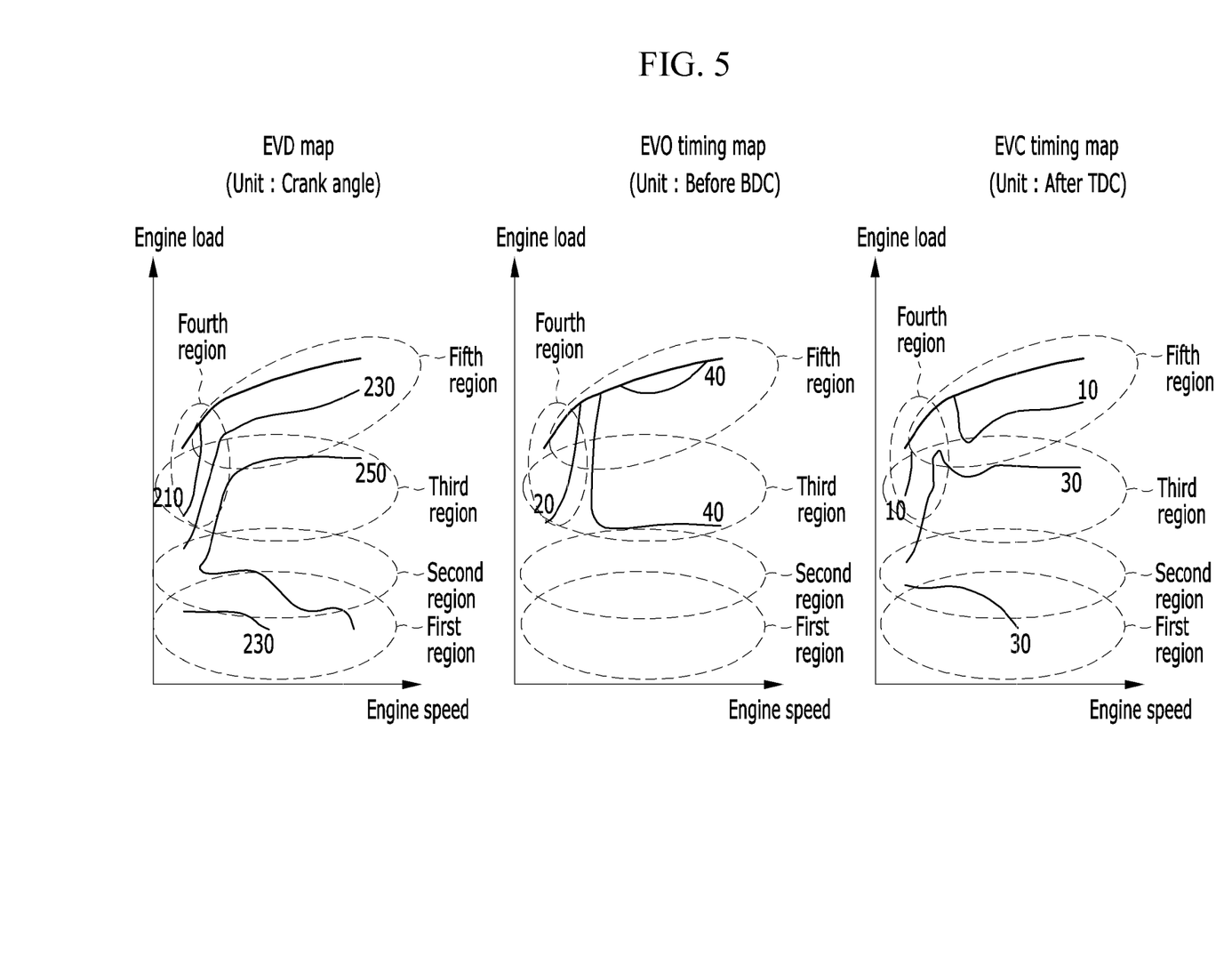
FIG. 5 is a graph showing duration, opening timing, and closing timing of an exhaust valve depending on an engine load and an engine speed.

Referring to FIG. 4 and FIG. 5, a crank angle is respectively marked in an intake valve duration (IVD) map and an exhaust valve duration (EVD) map, which indicate the open duration of the intake valve and exhaust valve. For example, regarding the IVD map in FIG. 4, crank angle is fixed to a range of 250-260 degrees. Further, regarding the IVO timing map in FIG. 4, a curved line written as, for example, a number "10" in the third region means that the IVO timing is, for example, 10 degrees BTDC (before top dead center).

A unit for numbers designated in an intake valve opening (IVO) timing map is degrees before top dead center (TDC). A unit for numbers designated in an intake valve closing (IVC) timing map is degrees after bottom dead center (BDC). A unit for numbers designated in an exhaust valve opening (EVO) timing map is degrees before BDC. And a unit for numbers designated in an exhaust valve closing (EVC) map is degrees after TDC.

Each region and curved line in FIG. 4 and FIG. 5 are an example of the exemplary form of the present disclosure, but may be modified within the technical idea and scope of the present disclosure.

If the control regions are classified in step S100 according to the engine speed and the engine load, controller 30 determines at step S110 whether the engine state is in the first control region.

In step S120, when the control region is determined to be the first region, the controller 30 retards the IVC timing and controls the valve overlap between the exhaust valve and intake valve. The valve overlap is a state in which the intake valve is opened and the exhaust valve is not yet closed.

In the first region, when the engine state is in a low-load state, it is advantageous to maximally retard the IVC timing in order to improve fuel consumption. Therefore, as shown in FIG. 4, the controller 30 retards the IVC timing to be at an angle of 100 degrees ABDC (after bottom dead center) such that the IVC timing is controlled to be at the LIVC (Late Intake Valve Close) position.

Further, the controller 30 moves the EVC timing to be at a predetermined value ATDC (after top dead center) and sets the EVC timing to a maximum value such that the combust stability is sustainable. Therefore, it is possible to control the valves such that the valve overlap is reduced.

When, in step S110, the control region is determined not to be the first region, the controller 30 determines, in step S130, whether the current engine state is in the second region.

When, in step S130, the current control region is determined to be the second region, at step S140 the controller 30 retards the IVC timing and controls the exhaust valve to be a maximum duration value.

If the IVC timing is positioned at LIVC position in the first region, the valve overlap is limited. Therefore, when the control region enters the second region, the controller 30 increases the valve overlap by advancing the IVC timing.

Further, the controller 30 fixes the EVO timing in order to reduce exhaust pumping and retards the EVC timing in order to increase the valve overlap such that the exhaust maximum duration can be applied.

When, in step S130, the control region is determined not to be the second region, at step S150 the controller 30 determines whether the current engine state is in the third region.

When, in step S150, the control region is determined to be the third region, at step S160 the controller 30 advances the IVC timing according to an increment of the engine load.

That is, the controller 30 advances the IVC timing while maintaining the exhaust maximum duration that is applied in the second region. At this time, because the IVO timing depends on the IVC timing, the IVO timing is also advanced as the IVC timing is advanced, and thus the valve overlap may be increased. Therefore, the controller 30 controls the EVC timing to be close to TDC (top dead center), while maintaining the EVO timing, and thus the controller 30 may control the valve overlap to be reduced.

When, in step S150, the control region is determined not to be the third region, at step S170 the controller 30 determines whether the current engine state is in the fourth control region.

When the control region is determined to be the fourth region, at step S180 the controller 30 controls a wide open throttle valve (WOT), advances the IVC timing, and retards the EVO timing.

Since back pressure is low in the fourth region, in which the engine speed is less than the predetermined speed (e.g., 1500 rpm), it is desirable to generate scavenging of exhaust combustion gas by decreasing pressure of an exhaust port. Therefore, the controller 30 may advance the IVC timing to generate the scavenging. Further, the controller 30 may retard the EVO timing to be close to BDC (bottom dead center) in order to avoid exhaust interference.

When, in step S170, the control region is determined not to be the fourth region, at step S190 the controller 30 determines whether the current engine state is in the fifth control region.

When the control region is determined to be the fifth region, at step S200 the controller 30 controls the wide open throttle valve (WOT) and retards the IVC timing.

If the WOT control is performed at the fifth region, in which the engine speed is greater than or equal to the predetermined speed (e.g., 1500 rpm), the scavenging disappears and the IVC timing becomes a major control factor. Thus, the IVC timing can be controlled to be an optimal value according to the engine speed. Referring to FIG. 4, in a low-speed region, in which the engine speed is less than the predetermined speed, as the engine speed is increased, the IVO timing may be gradually retarded from about 40 degrees after BDC (bottom dead center) to about 60 degrees after BDC.

However, because the IVO timing is dependent on the IVC timing, in a middle-speed region (e.g., 1500-3000 rpm), when the IVO timing is advanced and the valve overlap is increased in a middle-speed region, engine performance may be deteriorated.

Therefore, in order not to increase the valve overlap, the controller 30 may control the EVO timing to be a predetermined value before BDC (bottom dead center) and control the EVC timing to be close to TDC (top dead center). Referring to FIG. 5, the EVO timing may be controlled to be about 40 degrees before BDC (bottom dead center), which is advantageous to exhaust pumping, and the EVC timing may be controlled to be about TDC (top dead center).

As described above, according to an exemplary form of the present disclosure, duration and timing of the continuous variable valve are simultaneously controlled, so the engine may be controlled to run under optimum conditions.

That is, since opening timing and closing timing of the intake valve and the exhaust valve are optimally controlled, fuel efficiency under a partial load condition may be improved and engine performance under a high load condition may be improved. In addition, a starting fuel amount may be reduced by increasing a valid compression ratio, and exhaust gas may be reduced by shortening time for heating a catalyst.

Further, since a continuous variable valve duration device disposed on the intake side can be omitted using a fixed cam, it may be possible to reduce manufacturing cost and maintain power performance.

While this disclosure has been described in connection with what is presently considered to be practical exemplary forms, it is to be understood that the disclosure is not limited to the disclosed forms. On the contrary, it is intended to cover various modifications and equivalent arrangements included within the spirit and scope of the appended claims.

While this disclosure has been described in connection with what is presently considered to be practical exemplary forms, it is to be understood that the disclosure is not limited to the disclosed forms, but, on the contrary, is intended to cover various modifications and equivalent arrangements included within the spirit and scope of the appended claims.

What is claimed is:

1. A method for controlling an engine provided with a continuously variable valve timing (CVVT) device disposed on an intake valve side, and with a continuous variable valve duration (CVVD) device and a continuously variable valve timing (CVVT) disposed on an exhaust valve side, the method comprising:
   classifying, by a controller, a plurality of control regions depending on an engine speed and an engine load, wherein the plurality of control regions is divided into:
   a first region in which the engine load is less than a first predetermined load,
   a second region in which the engine load is greater than or equal to the first predetermined load and less than a second predetermined load,
   a third region in which the engine load is greater than or equal to the second predetermined load and less than a third predetermined load,
   a fourth region in which the engine load is greater than or equal to the second predetermined load and the engine speed is less than or equal to a predetermined speed, and
   a fifth region in which the engine load is greater than or equal to a third predetermined load and the engine speed is greater than the predetermined speed;
   when a control region of the engine is the first region, retarding, by the controller, an intake valve close (IVC) timing, and controlling, by the controller, a valve overlap by using the exhaust valve;
   when the control region of the engine is the second region, advancing, by the controller, the intake valve close (IVC) timing, and applying, by the controller, a maximum duration to an exhaust valve;
   when the control region of the engine is the third region, advancing, by the controller, the intake valve close (IVC) timing according to an increment of engine load;
   when the control region of the engine is the fourth region, controlling, by the controller, a wide open throttle valve (WOT), advancing, by the controller, the intake valve close (IVC) timing, and retarding, by the controller, an exhaust valve opening (EVO) timing; and
   when the control region of the engine is the fifth region, controlling, by the controller, a wide open throttle valve (WOT) and retarding, by the controller, the intake valve close (IVC) timing.

2. The method of claim 1, wherein when the control region of the engine is the first region, the controller retards the IVC timing to a maximum value, and controls the valve overlap by the exhaust valve by setting up within sustainable combust stability.

3. The method of claim 1, wherein when the control region of the engine is the second region, the controller fixes the EVO timing to reduce exhaust pumping, and applies an exhaust maximum duration by retarding the EVC timing to increase the valve overlap.

4. The method of claim 1, wherein when the control region of the engine is the third region, the controller maintains the EVO timing by advancing the IVC timing, and controls the EVC timing to be close to top dead center.

5. The method of claim 1, wherein when the control region of the engine is the fifth region, the controller controls the EVO timing to be before bottom dead center in order not to increase the valve overlap, and controls the EVC timing to be close to top dead center.

6. An apparatus for controlling an engine comprising:
a data detector configured to detect data related to a running state of a vehicle;
a camshaft position sensor configured to detect a position of a camshaft;
an intake continuous variable valve timing (CVVT) device configured to control an opening and closing timing of an intake valve of the engine;
an exhaust continuous variable valve duration (CVVD) device configured to control an open duration of an exhaust valve of the engine;
an exhaust continuous variable valve timing (CVVT) device configured to control an opening and closing timing of the exhaust valve of the engine; and
a controller configured to:
classify a plurality of control regions depending on an engine speed and an engine load based on signals from the data detector and camshaft position sensor, and
control the intake CVVT, the exhaust CVVD device, and the exhaust CVVT device according to a control region of the engine;
wherein the plurality of control regions is divided into
a first region in which the engine load is less than a first predetermined load,
a second region in which the engine load is greater than or equal to the first predetermined load and less than a second predetermined load,
a third region in which the engine load is greater than or equal to the second predetermined load and less than a third predetermined load,
a fourth region in which the engine load is greater than or equal to the second predetermined load and the engine speed is less than or equal to a predetermined speed, and
a fifth region in which the engine load is greater than or equal to a third predetermined load and the engine speed is greater than the predetermined speed; and
wherein the controller is further configured to:
when the control region of the engine is the first region, retard an intake valve close (IVC) timing, and control a valve overlap by using the exhaust valve,
when the control region of the engine is the second region, advance the intake valve close (IVC) timing, and apply a maximum duration to an exhaust valve,
when the control region of the engine is the third region, advance the intake valve close (IVC) timing according to an increment of the engine load,
when the control region of the engine is the fourth region, control a wide open throttle valve (WOT), advance the intake valve close (IVC) timing, and retard an exhaust valve opening (EVO) timing, and
when the control region of the engine is the fifth region, control the wide open throttle valve (WOT), and retard the intake valve close (IVC) timing.

7. The apparatus of claim 6, wherein the controller is configured to, when the control region of the engine is the first region, retard the IVC timing to a maximum value, and control the exhaust valve close (EVC) timing to a maximum value within sustainable combust stability.

8. The apparatus of claim 6, wherein the controller is configured to, when the control region of the engine is the second region, fix the EVO timing to reduce exhaust pumping, and apply an exhaust maximum duration by retarding the EVC timing to increase the valve overlap.

9. The apparatus of claim 6, wherein the controller is configured to, when the control region of the engine is the third region, maintain the EVO timing by retarding the IVC timing and controlling the EVC timing to be close to top dead center.

10. The apparatus of claim 6, wherein the controller is configured to, when the control region of the engine is the fifth region, control the EVO timing to be before bottom dead center in order not to increase the valve overlap, and control the EVC timing to be close to top dead center.

* * * * *